(12) United States Patent
Verduzco et al.

(10) Patent No.: US 9,260,570 B2
(45) Date of Patent: Feb. 16, 2016

(54) COMPRESSION INDUCED STIFFENING AND ALIGNMENT OF LIQUID CRYSTAL ELASTOMERS

(71) Applicants: Rafael Verduzco, Houston, TX (US); Aditya Agrawal, Houston, TX (US); Alin Cristian Chipara, Bel Air, MD (US)

(72) Inventors: Rafael Verduzco, Houston, TX (US); Aditya Agrawal, Houston, TX (US); Alin Cristian Chipara, Bel Air, MD (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 247 days.

(21) Appl. No.: 13/860,392

(22) Filed: Apr. 10, 2013

(65) Prior Publication Data

US 2013/0296505 A1   Nov. 7, 2013

Related U.S. Application Data

(60) Provisional application No. 61/622,134, filed on Apr. 10, 2012.

(51) Int. Cl.
| | |
|---|---|
| B29C 71/00 | (2006.01) |
| C08G 77/06 | (2006.01) |
| C08G 77/398 | (2006.01) |
| C09K 19/38 | (2006.01) |
| C09K 19/40 | (2006.01) |
| C09K 19/04 | (2006.01) |
| B29K 105/00 | (2006.01) |
| C08G 77/12 | (2006.01) |

(52) U.S. Cl.
CPC .............. *C08G 77/06* (2013.01); *B29C 71/00* (2013.01); *B29C 71/0072* (2013.01); *C08G 77/398* (2013.01); *B29K 2105/0079* (2013.01); *C08G 77/12* (2013.01); *C09K 19/3833* (2013.01); *C09K 19/408* (2013.01); *C09K 2019/0448* (2013.01)

(58) Field of Classification Search
CPC ............. C09K 19/3833; C09K 19/408; C09K 2019/0448; C08G 77/04; C08G 77/06; C08G 77/12; B29K 2105/0079; B29C 71/0072
See application file for complete search history.

(56) References Cited

U.S. PATENT DOCUMENTS 5,385,690 A * 1/1995 Finkelmann et al. ..... 252/299.01

OTHER PUBLICATIONS

Taber, L. A. Biomechanics of Growth, Remodeling, and Morphogenesis. Applied Mechanics Reviews 48, 487-545 (1995).

(Continued)

*Primary Examiner* — Shean C Wu
(74) *Attorney, Agent, or Firm* — Winstead PC

(57) ABSTRACT

In some embodiments, the present disclosure provides methods of strengthening liquid crystal elastomers. In some embodiments, such methods include a step of placing the liquid crystal elastomer in an environment that applies dynamic stress to the liquid crystal elastomer. In further embodiments, the methods of the present disclosure also include a step of providing liquid crystal elastomers for placement in an environment that applies dynamic stress. In some embodiments, the liquid crystal elastomer is in a nematic phase before or during the application of dynamic stress. In some embodiments, the application of dynamic stress enhances the stiffness of the liquid crystal elastomer by more than about 10%. Further embodiments of the present disclosure pertain to liquid crystal elastomers that are made by the methods of the present disclosure.

10 Claims, 7 Drawing Sheets

(56) References Cited

OTHER PUBLICATIONS

Kuhl, E., Garikipati, K., Arruda, E. M. & Grosh, K. Remodeling of biological tissue: Mechanically induced reorientation of a transversely isotropic chain network. Journal of the Mechanics and Physics of Solids 53, 1552-1573 (2005).
Finkelmann, H., Kock, H. J. & Rehage, G. Investigations on liquid crystalline polysiloxanes liquid crystalline elastomers (a new type of liquid crystalline material). Macromol. Chem. Rapid. Commun. 2, 317 (1981).
Finkelmann, H., Greve, A. & Warner, M. The elastic anisotropy of nematic elastomers. Eur. J. Phys. E 5, 281-293 (2001).
Warner, M. & Terentjev, E. M. Nematic elastomers—A new state of matter? Prog. Polym. Sci. 21, 853-891 (1996).
Camacho-Lopez, M., Finkelmann, H., Palffy-Muhoray, P. & Shelley, M. Fast liquid-crystal elastomer swims into the dark. Nat Mater 3, 307-310 (2004).
Finkelmann, H., Kim, S. T., Munoz, A., Palffy-Muhoray, P. & Taheri, B. Tunable mirrorless lasing in cholesteric liquid crystalline elastomers. Adv. Mater. 13, 1069 (2001).
Clarke, S. M., Terentjev, E. M., Kundler, I. & Finkelmann, H. Texture Evolution during the Polydomain-Monodomain Transition in Nematic Elastomers. Macromolecules 31, 4862-4872 (1998).
Patil, H. P., Lentz, D. M. & Hedden, R. C. Necking Instability during Polydomain-Monodomain Transition in a Smectic Main-Chain Elastomer. Macromolecules 42, 3525-3531 (2009).
Urayama, K. Selected Issues in Liquid Crystal Elastomers and Gels. Macromolecules 40, 2277-2288, (2007).
Biggins, J. S., Warner, M. & Bhattacharya, K. Elasticity of polydomain liquid crystal elastomers. Journal of the Mechanics and Physics of Solids 60, 573-590 (2012).
Kupfer, J. & Finkelmann, H. Nematic Liquid Single-Crystal Elastomers. Makromol. Chem.-Rapid 12, 717-726 (1991).
Carey, B. J., Patra, P. K., Ci, L., Silva, G. G. & Ajayan, P. M. Observation of Dynamic Strain Hardening in Polymer Nanocomposites. ACS Nano 5, 2715-2722, (2011).
Mitchell, G. R., Davis, F. J. & Ashman, A. Structural studies of side-chain liquid crystal polymers and elastomers. Polymer 28, 639-647, (1987).
Ren et al., Mechanism of strain retention and shape memory in main chain liquid crystalline networks, Phys. Status Solidi B 249, No. 7, 1379-1385 (2012).
Clarke et al., Slow Stress Relaxation in Randomly Disordered Nematic Elastomers and Gels, Physical Review Letters, vol. 81, No. 20, 4436-4439 (1998).

* cited by examiner x-y plane     y-z plane     x-z plane

US 9,260,570 B2

COMPRESSION INDUCED STIFFENING AND ALIGNMENT OF LIQUID CRYSTAL ELASTOMERS

CROSS-REFERENCE TO RELATED APPLICATIONS

This application claims priority to U.S. Provisional Patent Application No. 61/622,134, filed on Apr. 10, 2012. The entirety of the aforementioned application is incorporated herein by reference.

STATEMENT REGARDING FEDERALLY SPONSORED RESEARCH

This invention was made with government support under Grant No. CBET-0756166, awarded by the National Science Foundation. The government has certain rights in the invention.

BACKGROUND

Current methods for adaptively strengthening synthetic materials (such as liquid crystal elastomers) have numerous limitations in terms of efficacy and long term adaptation. Therefore, there is a need for more effective methods of adaptively strengthening synthetic materials.

SUMMARY

In some embodiments, the present disclosure provides methods of strengthening liquid crystal elastomers. In some embodiments, such methods include a step of placing the liquid crystal elastomer in an environment that applies dynamic stress to the liquid crystal elastomer. In further embodiments, the methods of the present disclosure also include a step of providing liquid crystal elastomers for placement in an environment that applies dynamic stress.

In some embodiments, the liquid crystal elastomer is a polydomain liquid crystal elastomer. In some embodiments, the liquid crystal elastomer includes a nematic director and a mesogen associated with a polymer. In some embodiments, the mesogen content of the liquid crystal elastomer ranges from about 20% molar content to about 90% molar content of the liquid crystal elastomer. In some embodiments, the mesogen may include at least one of aromatic rings, aliphatic rings, poly aromatic rings, poly aliphatic rings, phenyls, biphenyls, benzenes, and combinations thereof. In some embodiments, the mesogen is functionalized with one or more functional groups, such as alkenes, alkanes, alkynes, carboxyl groups, esters, halogens, and combinations thereof.

In some embodiments, mesogens in liquid crystal elastomers are cross-linked polymers. In some embodiments, the polymer includes at least one of polysiloxanes, poly(methyl) siloxanes (PMS), poly(dimethyl)siloxanes (PDMS), poly (hydrogen methyl)siloxanes (PHMS), and combinations thereof.

In some embodiments, the liquid crystal elastomer is in a nematic phase before or during the application of dynamic stress. In some embodiments, the dynamic stress is applied by dynamic compression. In some embodiments, the dynamic stress is applied in multiple cycles. In some embodiments, the multiple cycles may include from about 2 cycles to about 300,000 cycles. In some embodiments, the dynamic stress is applied below the nematic to isotropic transition temperature ($T_{NI}$) of the liquid crystal elastomer.

In some embodiments, the application of dynamic stress enhances the stiffness of the liquid crystal elastomer by more than about 10%. In some embodiments, the application of dynamic stress enhances the stiffness of the liquid crystal elastomer by between about 10% to about 90%. In some embodiments, the application of dynamic stress enhances the stiffness of the liquid crystal elastomer by more than about 30%. In some embodiments, the application of dynamic stress leads to the rotation or reorientation of the nematic director of the liquid crystal elastomer.

Further embodiments of the present disclosure pertain to liquid crystal elastomers with enhanced stiffness. In some embodiments, the liquid crystal elastomers are made by the methods of the present disclosure.

BRIEF DESCRIPTION OF THE FIGURES

FIG. 2 provides schemes and illustrations relating to the synthesis and dynamic strain stiffening of polydomain LCEs.

FIG. 4 provides a microstructure analysis of LCEs after dynamic compression.

FIG. 5 shows data relating to the reorientation of LC polymer chains under dynamic compression.

DETAILED DESCRIPTION

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise. Parameters disclosed herein (e.g., temperature, time, concentrations, etc.) may be approximate.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Biological tissues have the remarkable ability to remodel and repair in response to disease, injury and mechanical stresses. Well-known examples of adaptive remodeling include bone remodeling and strengthening through a process that involves changes in bone mass and porosity. Additional examples of adaptive remodeling include muscle development, tumor growth, and changes in blood vessel structure. However, synthetic materials lack the complexity of biological tissues. In fact, synthetic materials that respond to external stresses through an increase in stiffness are uncommon.

Though liquid crystal elastomers have demonstrated adaptive strengthening, such strengthening is limited in amount and duration. Therefore, there is a need for more effective methods of adaptively strengthening synthetic materials, such as liquid crystal elastomers. There is also a need for synthetic materials that adaptively strengthen in response to stress. The present disclosure addresses these needs.

Figure 1:
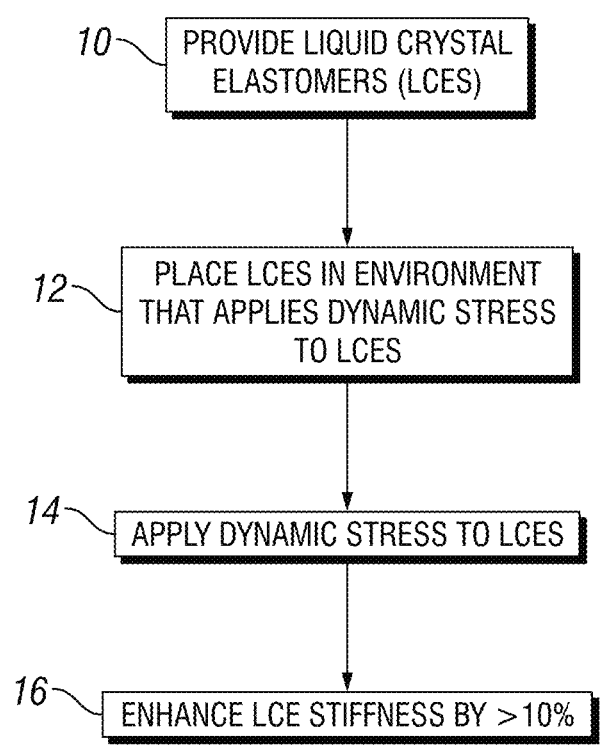
FIG. 1 provides a scheme of a method of strengthening liquid crystal elastomers (LCEs).

In some embodiments, the present disclosure provides methods of strengthening liquid crystal elastomers. Such methods are illustrated in FIG. 1 and may include one or more of the following steps: providing liquid crystal elastomers (LCE) (step 10); placing the LCEs in an environment that applies dynamic stress to the LCEs (step 12); applying dynamic stress to the LCEs (step 14); and enhancing the stiffness of the LCEs by more than about 10% as a result of the application of the dynamic stress (step 16). Further embodiments of the present disclosure pertain to LCEs made by the methods of the present disclosure.

As set forth in more detail herein, the methods and compositions of the present disclosure have numerous embodiments and variations. In particular, various LCEs may be used in the methods of the present disclosure. Likewise, the LCEs may be placed in various environments. In addition, various types of dynamic stress may be applied to the LCEs. Furthermore, the stiffness of the LCEs may be enhanced to various levels.

Liquid Crystal Elastomers

Figure 2A:
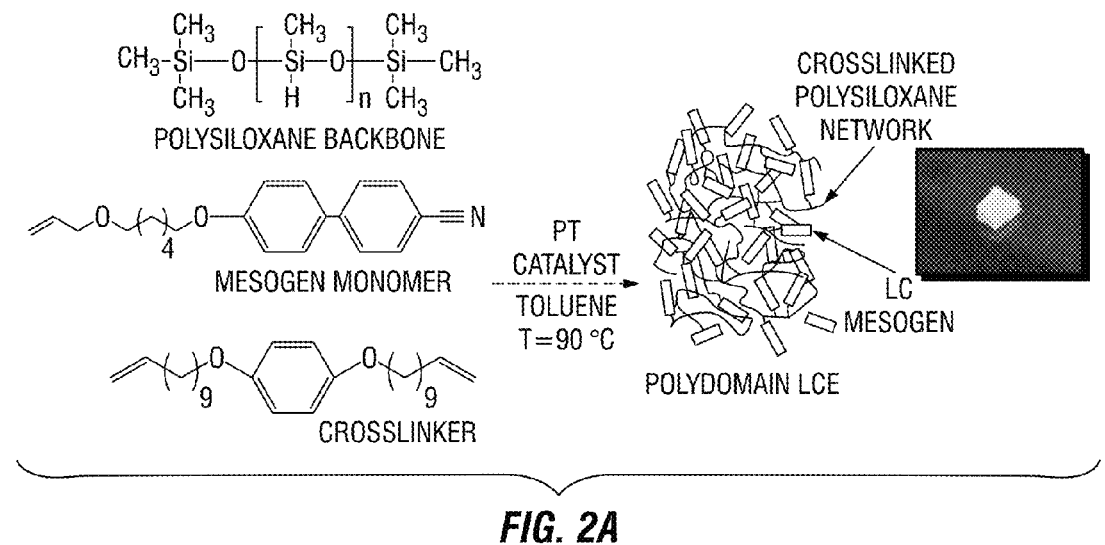
FIG. 2A provides a schematic for the synthesis of a polydomain LCE. A representative LCE sample is shown on the right-hand side. Dynamic mechanical analysis (DMA) was carried out on LCEs with dimensions of 1.5×1.5×1 mm³.

In general, LCEs include networks of flexible polymer chains with liquid crystalline order (FIG. 2A). LCEs exhibit 'soft elasticity' that is exemplified by large-strain deformations with little resistance. In addition, network chains in LCEs are locally anisotropic and assume an ellipsoidal conformation, in contrast to the spherical random coil conformation of conventional isotropic rubbers.

In some embodiments, the LCEs of the present disclosure include a nematic director. In some embodiments, the LCEs of the present disclosure also include a mesogen that is associated with a polymer. In some embodiments, the LCEs are in a nematic phase before or during the application of dynamic stress. In some embodiments, the LCE nematic phase may include a biaxial nematic phase or a chiral nematic phase. In some embodiments, the LCEs may be in a smectic phase or a cholestric phase before or during the application of dynamic stress.

In some embodiments, the LCEs of the present disclosure may include polydomain LCEs. In some embodiments, the polydomain LCEs may lack an orientation of the nematic director prior to or during the application of dynamic stress. Furthermore, the LCEs of the present disclosure may include various types of polymers and mesogens.

Mesogens

The LCEs of the present disclosure may include one or more mesogens. In various embodiments, the one or more mesogens may include, without limitation, aromatic rings, aliphatic rings, poly aromatic rings, poly aliphatic rings, phenyls, biphenyls, benzenes, and combinations thereof.

In more specific embodiments, the mesogens in the LCEs of the present disclosure may include a biphenyl ring. In some embodiments, the biphenyl ring may be derived from 4(1-hexanol oxy)-4'-cyano biphenyl.

In some embodiments, the mesogens in the LCEs of the present disclosure may be unfunctionalized. In some embodiments, the mesogens in the LCEs of the present disclosure may be functionalized with one or more functional groups. In some embodiments, the functional groups may include, without limitation, alkenes, alkanes, alkynes, carboxyl groups, esters, halogens, and combinations thereof. In more specific embodiments, the mesogens in the LCEs of the present disclosure may include alkene functionalized biphenyl rings.

The LCEs of the present disclosure may have various mesogen contents. For instance, in some embodiments, the LCEs of the present disclosure may have a mesogen content that ranges from about 20% molar content to about 90% molar content of the LCEs. In more specific embodiments, the LCEs of the present disclosure may have mesogen contents of about 90%, about 80%, about 60%, about 40% or about 20% molar content of the LCEs.

Polymers

The LCEs of the present disclosure may also include one or more polymers. For instance, in some embodiments, the polymers may include, without limitation, polysiloxanes, poly(methyl)siloxanes (PMS), poly(dimethyl)siloxanes (PDMS), poly(hydrogen methyl)siloxanes (PHMS), and combinations thereof. In more specific embodiments, the polymers may include PHMS.

The polymers may be associated with mesogens in various arrangements. For instance, in some embodiments, the mesogens may be cross-linked to polymers. In some embodiments, a plurality of mesogens may be covalently coupled to a single polymer chain. In some embodiments, a plurality of mesogens may be covalently coupled to multiple polymer chains. In some embodiments, the mesogens and polymers may be intertwined within a matrix.

Environments

The LCEs of the present disclosure may be placed in various environments for the application of dynamic stress. For instance, in some embodiments, the environment is a compressing structure that applies dynamic compression. In more specific embodiments, the compressing structure may be a plate, such as a plate shown in FIG. 2. In some embodiments, the environment may apply a deformation, such as a uniaxial strain or a shear deformation. Additional environments for the application of dynamic stress can also be envisioned.

Dynamic Stress

Dynamic stress generally refers to the application of a repetitive deformation. In some embodiments, the deformation may be a compression, extension, or a shear deformation. In some embodiments, the deformation has a defined amplitude and frequency.

Dynamic stress may be applied to LCEs in various manners. For instance, in some embodiments, the dynamic stress may be applied by dynamic compression. In some embodiments, the dynamic stress may be applied in multiple cycles. For instance, in some embodiments, the dynamic stress may be applied in about 2 cycles to about 300,000 cycles. In some embodiments, the dynamic stress may be applied in more than about 300,000 cycles. In some embodiments, the dynamic stress may be applied in multiple cycles over several days.

In addition, various types of dynamic stress may be applied to LCEs. For instance, in some embodiments, the dynamic stress may include low amplitude dynamic stress. In some embodiments, the low amplitude dynamic stress may vary from about 0.1% strain to about 10% strain. In some embodiments, the dynamic stress may include high amplitude dynamic stress. In some embodiments, the high amplitude strain may vary from about 10% strain to about 1000% strain. Additional types of dynamic stress can also be envisioned.

Furthermore, dynamic stress may be applied to LCEs under various conditions. For instance, in some embodiments, dynamic stress may be applied below the nematic to isotropic transition temperature ($T_{NI}$) of the LCEs. In some embodiments, the LCEs may be in a nematic phase before or during the application of dynamic stress. Therefore, in further embodiments, the methods of the present disclosure may also include a step of placing the LCEs in a nematic phase prior to applying dynamic stress.

Effects of Dynamic Stress on LCEs

The application of dynamic stress to the LCEs of the present disclosure can have various effects on the LCEs. For instance, in some embodiments, the application of dynamic stress enhances the stiffness of the LCEs. In some embodiments, the application of dynamic stress enhances the stiffness of the LCEs by between about 10% to about 90%. In some embodiments, the application of dynamic stress enhances the stiffness of the LCEs by more than about 30%.

In some embodiments, the application of dynamic stress leads to a temporary or transient enhancement of stiffness in the LCEs. In some embodiments, the application of dynamic stress leads to a permanent enhancement of the stiffness of the LCEs.

In various embodiments, the application of dynamic stress enhances the nematic order of the LCEs. In some embodiments, the application of dynamic stress enhances the nematic order of the liquid crystal elastomer in a plane perpendicular to the axis of the applied dynamic stress.

In some embodiments, the application of dynamic stress leads to the rotation, reorientation and/or alignment of the nematic director of the liquid crystal elastomer. In further embodiments, the application of dynamic stress leads to the rotation, reorientation and/or alignment of the nematic director of the liquid crystal elastomer away from the axis of the applied dynamic stress.

In further embodiments, the application of dynamic stress leads to the alignment of the LCEs in a particular direction. In some embodiments, the LCEs uniformly align in a single direction in response to dynamic stress. In some embodiments, the LCEs align in a direction away from the axis of the applied dynamic stress. In some embodiments, the LCEs align in a direction perpendicular to the axis of the applied dynamic stress.

Applications and Advantages

The methods of the present disclosure may be utilized to make stiffened LCEs for various applications. For instance, the methods of the present disclosure may be used for the development of self-healing materials. The methods of the present disclosure may also be used for the development of biocompatible, adaptive materials for tissue replacement.

Furthermore, the methods of the present disclosure can provide a facile method to prepare uniformly aligned LCEs that are typically prepared by applying large tensile strains or external fields during material synthesis.

Additional Embodiments

Reference will now be made to various embodiments of the present disclosure and experimental results that provide support for such embodiments. However, Applicants note that the disclosure herein is for illustrative purposes only and is not intended to limit the scope of the claimed subject matter in any way.

Example 1

Dynamic Self-Stiffening in Liquid Crystal Elastomers

In this Example, Applicants report that polydomain nematic liquid crystal elastomers (LCEs) increase in stiffness by up to 90% when subjected to a low-amplitude (5%), repetitive (dynamic) compression. Applicants also observed that elastomer stiffening is influenced by liquid crystal content, presence of a nematic liquid crystal phase, and the use of a dynamic as opposed to static deformation. Through rheological and X-ray diffraction measurements, stiffening can be attributed to the presence of a mobile nematic director, which rotates and re-orients in response to dynamic compression.

Dynamic Stiffening of Polydomain LCEs

Figure 2B:
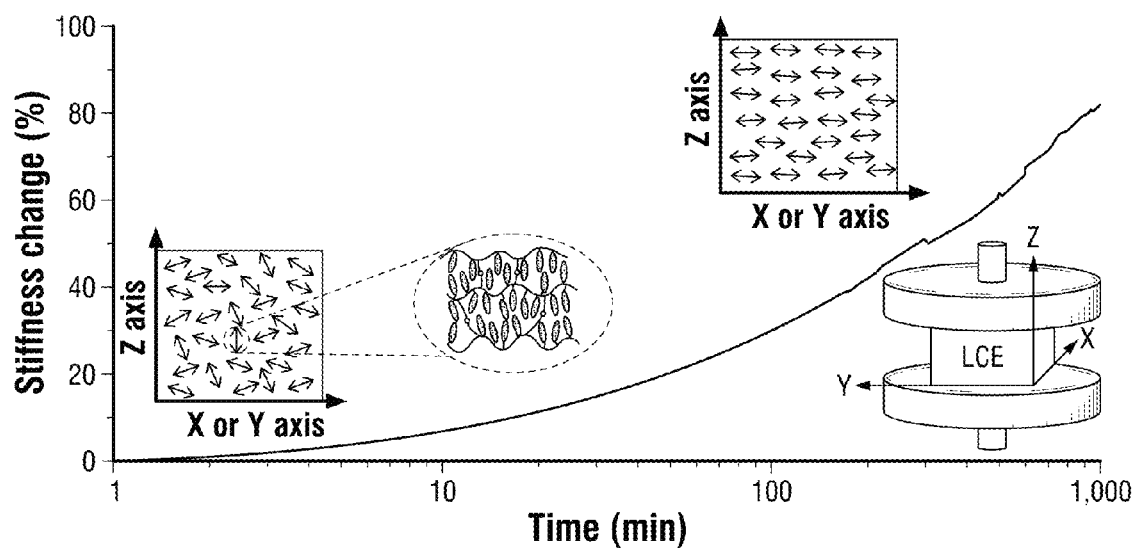
FIG. 2B shows results relating to a change in stiffness (%) versus time for a LCE (LCE90) under repetitive (dynamic) compression. The LCE is dynamically compressed between two flat plates at 5 Hz, 45° C., a preload of 0.01 N, and a 5% strain amplitude using a DMA Q800. Schematics in the bottom-left and top-right panels show the alignment of nematic domains in LCEs subjected to repetitive compression. The inset in the bottom right shows schematic of experimental protocol employed for the dynamic compression of polydomain LCEs. The data shown are plotted on linear-log axes.

To investigate the role of LCE mesogen content on mechanical properties, a systematic series of polydomain LCEs (LCE90, LCE80, LCE60, LCE40 and LCE20) were prepared with mesogen content ranging from 90 mol % to 20 mol % relative to the Si—H bonds in the PHMS polymer (Table 1). Poly(dimethyl siloxane) (PDMS) was also studied for comparison with the LCEs. PDMS is chemically and mechanically similar to the LCEs studied, but with no mesogen content. Under 16 h of repetitive, compressive loading (5 Hz, 5% strain), LCE90 exhibits a 90% increase in stiffness (FIG. 2B). The strain amplitude is maintained at 5% for the duration of the experiment. As shown in Table 1, the final stiffness of LCE90 surpasses the initial values of other LCEs studied despite the lower crosslink density of LCE90.

| Sample | Mesogen content* (mole %) | Crosslinker content* (mole %) | $T_{NI}$† (° C.) | Initial stiffness‡ ($Nm^{-1}$) | Final stiffness§ ($Nm^{-1}$) | Change in stiffness§ (%) |
|---|---|---|---|---|---|---|
| LCE90 | 90 | 10 | 67 | 5308 | 10201 | 89 |
| LCE80 | 80 | 20 | 55 | 5493 | 8960 | 63 |
| LCE60 | 60 | 40 | 50 | 7921 | 10005 | 33 |
| LCE40 | 40 | 40 | NA | 6708 | 7358 | 14 |
| LCE20 | 20 | 40 | NA | 6471 | 7388 | 14 |
| PDM5 | NA | 0.493† | NA | 4090 | 4145 | 1.4 |

Table 1 summarizes the characteristics of LCEs and PDMS. The abbreviations are as follows: LCE, liquid crystal elastomer; NA, not applicable; PDMS, poly(dimethyl siloxane); *, Relative to molar content of Si—H in PHMS; nematic to isotropic transition temperature. $T_{NI}$ was measured by DSC. Where no $T_{NI}$ value is listed, no measureable $T_{NI}$ was found down to 0° C. Initial stiffness was measured at 5% strain. Final stiffness was measured at 5% strain after ~17 h of continuous dynamic compression. Degree of PDMS crosslinking was measured as $nm^{-3}$ (J. Micromech. Microeng. 18, 065008 (2008)).

Figure 3:
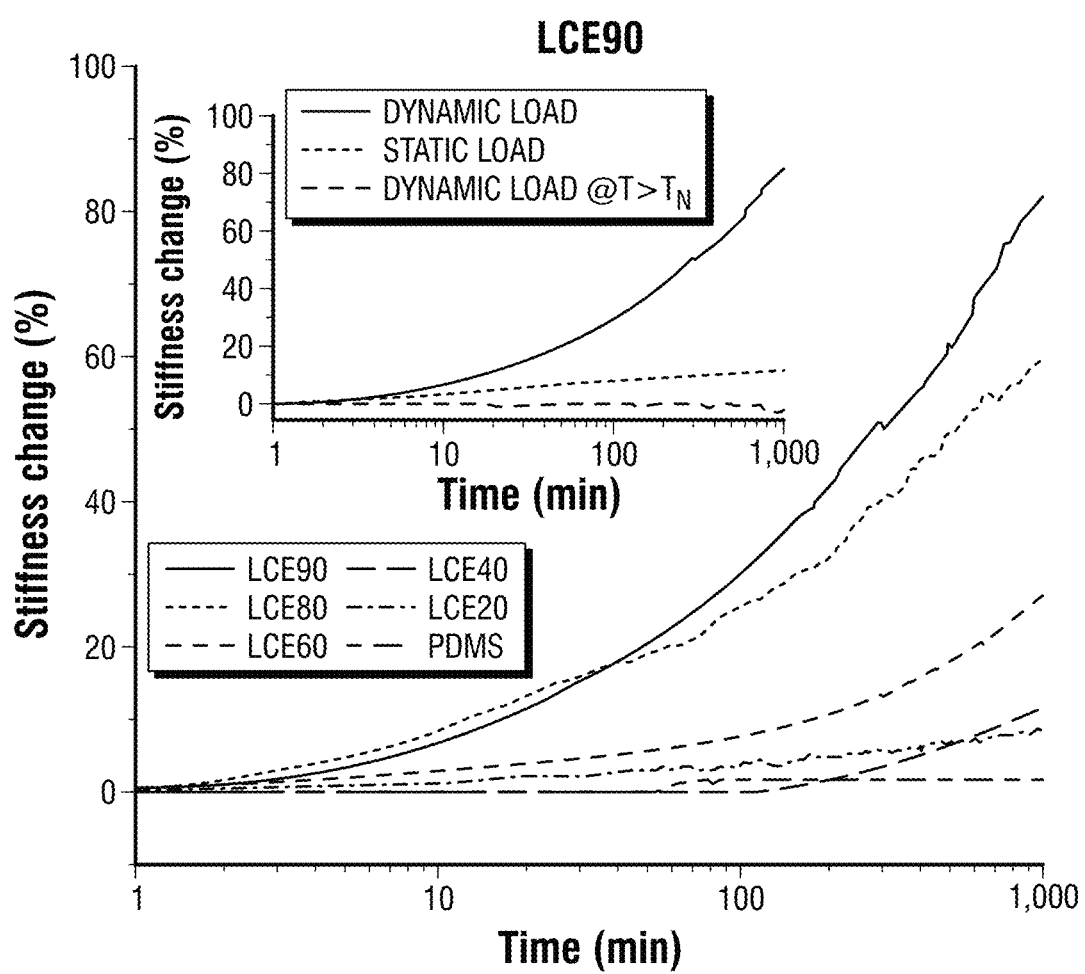
FIG. 3 shows data relating to dynamic strain stiffening in LCEs with varying mesogen content. Change in stiffness (%) versus time for a series of LCEs varying in mesogen content and polydimethyl siloxane (PDMS) under dynamic compressive strain. The data shown are plotted on linear-log axes. The extent of stiffening is correlated with LCE mesogen content. Measurements were carried out at 5 Hz, 45° C. and at 5% strain amplitude. The top inset compares dynamic strain stiffening in LCE90 under dynamic load, static load and dynamic load above the LCE's nematic-isotropic transition temperature $T_{NI}$ (80° C.). The data demonstrate that stiffening is only observed in the nematic phase under dynamic compression. For static load tests, samples were subjected to a compressive strain of 6%, both greater than the corresponding stress and strain values applied during dynamic loading.

Dynamic mechanical analysis (DMA) of all LCEs prepared shows that mesogen content is correlated with increased stiffness, in particular for the series of samples where the crosslink density is held constant (LCE20, LCE40 and LCE60) (FIG. 3). LCE60 and LCE80 exhibit a similar, although less pronounced, stiffening response compared with LCE90. The stiffness increase under 5% compressive loading is 63% and 33% for LCE80 and LCE60, respectively. LCE20 and LCE40, both with no nematic phase, exhibit a stiffness increase of only 14%. Finally, PDMS exhibits a stiffness increase of only 1.4%.

Applicants have observed that the presence of nematic order and the application of a repetitive (dynamic) load positively affect the stiffening response (FIG. 3). As shown in the inset of FIG. 3, LCE90 exhibits a modest increase in stiffness when dynamically compressed in the isotropic phase at 80° C. (~15%, similar to LCE20 and LCE40). However, stiffness increases by >80% when the same measurement is carried out in the nematic phase at 45° C. This same trend is observed for all nematic LCEs (data not shown).

Furthermore, stiffening is only observed under dynamic, compressive stress. For instance, an extended static compression test with an applied stress greater than the maximum stress applied during dynamic compression (70 kPa) and a strain of 6% resulted in only a modest (~10%) stiffness increase (see inset of FIG. 3). Thus, consistent with previous reports, a static deformation at low strain (<10%) does not result in significant changes to the microstructure of the LCE. As an additional control experiment, samples held at 45° C. for at least 16 h in the DMA without compression show no stiffness increase.

LCE Microstructure Analysis

Figure 4B:
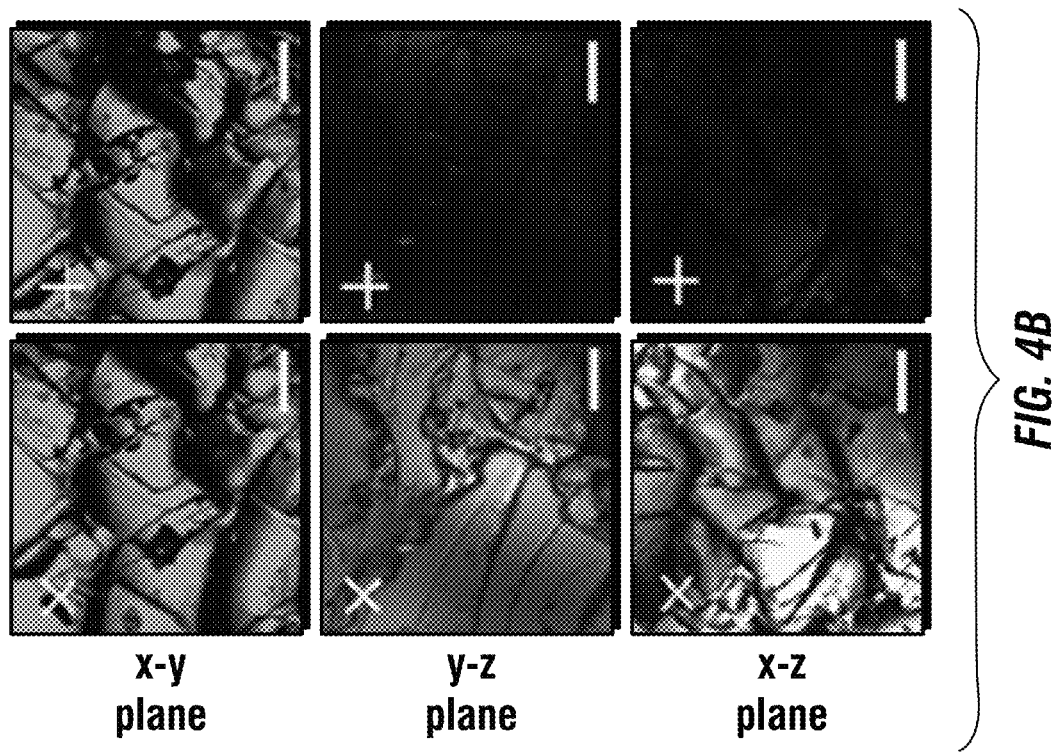
FIG. 4B provides polarizing optical microscopy images of dynamically stressed LCE90 along three different faces. Reduced light transmission through the x-z and y-z faces when crossed polarizers are oriented parallel to the compression direction (z axis) indicates reorientation of the nematic director perpendicular to the z axis. All scale bar, 0.1 mm.
Figure 4A:
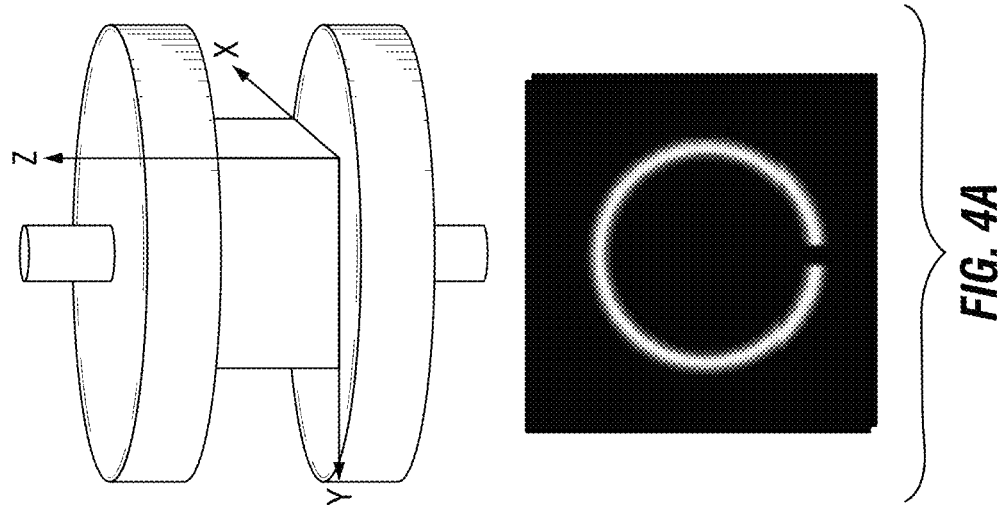
FIG. 4A provides a schematic of geometry during dynamic compression experiment and 2D WAXD pattern of unstressed, polydomain LCE90. All LCEs exhibit similar 2D WAXD patterns before dynamic compression.
Figure 4C:
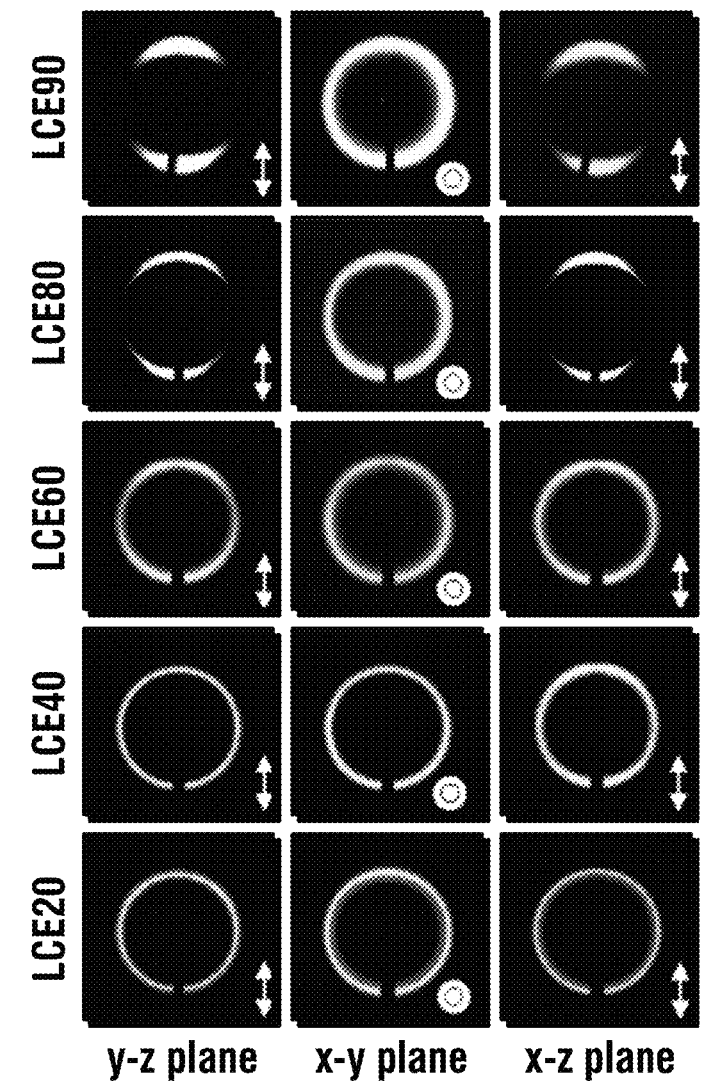
FIG. 4C shows 2D WAXD patterns of LCEs with varying mesogenic content subjected to compressive dynamic load (5 Hz, 5% strain) for at least 16 h. The patterns are shown for three independent LCE faces (x-z plane, x-y plane and y-z plane), and the arrow on the bottom right-hand side indicates the direction of compression. The anisotropic scattering pattern observed for the x-z and y-z planes indicates that the LCE nematic director rotates away from the z axis (compressive direction) to lie primarily in the x-y plane, but the nematic director remains disordered in the x-y plane.

Microstructure changes in polydomain LCEs were analyzed by 2D WAXD before and after deformation. In the experimental configuration used for this study, scattering peaks corresponding to mesogen spacing along the molecular width are clearly resolved (FIG. 4), enabling quantification of orientational ordering of the mesogenic side groups. X-ray scattering measurements were performed using a Rigaku Raxis-IV++ equipped with an incident beam monochromator, pinhole collimation (0.3 mm) and Cu X-ray tube (1¼ 1.54 Å). The sample to detector distance was 100 mm. Before compressive deformation, all LCEs exhibit an isotropic scattering peak characteristic of a polydomain nematic LCE (FIG. 4A). After dynamic compression, a clear anisotropy emerges in LCE90, LCE80 and LCE60 (FIG. 4C). Anisotropic scattering is only observed in the x-z and y-z planes, but the scattering pattern in the x-y plane remains isotropic. This indicates that the nematic director in these samples rotates away from the z axis (compressive direction) to lie primarily in the x-y plane but remains globally disordered in the x-y plane, resulting in an oblate LC orientation after dynamic compression. The reorientation of the LC side-groups can also be followed qualitatively through polarized optical microscopy. Global reorientation of the nematic director away from the z axis is consistent with reduced light transmission through the x-z and y-z faces when crossed polarizers are aligned with the axis of compression (FIG. 4B).

Coupling Between Elastomer Deformation and Nematic Director Orientation

Figure 4D:
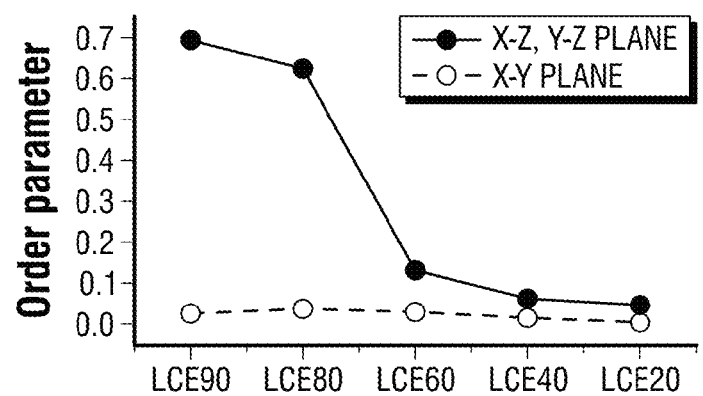
FIG. 4D shows macroscopic alignment parameter S for dynamically stressed LCEs extracted from model fit of 2D WAXD pattern. The order parameter S is defined with respect to the x-y plane. The order parameters for the x-z and y-z planes are an average of the order parameters measured in each plane.
Figure 5A:
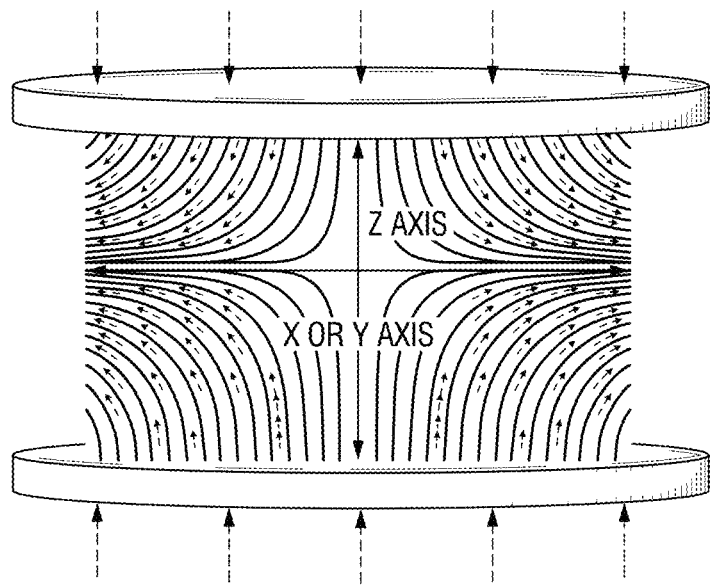
FIG. 5A shows finite element modeling (FEM) simulation showing stress lines as a result of compression. FEM simulations were performed out using COMSOL Multiphysics 4.2 simulation package.
Figure 5B:
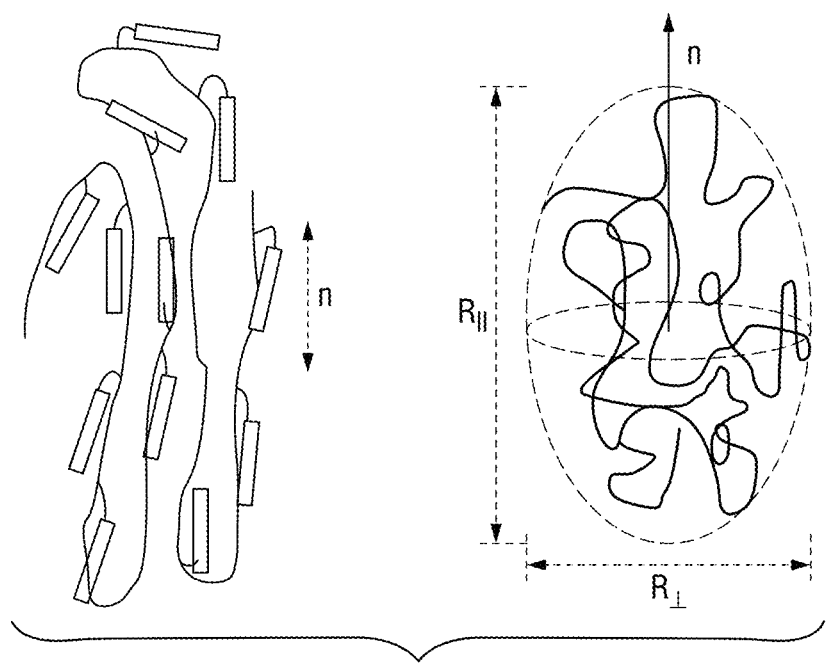
FIG. 5B shows a schematic depiction of a prolate LC polymer chain. Note that the mesogenic side-groups are oriented preferentially parallel to the polymer backbone.
Figure 5C:
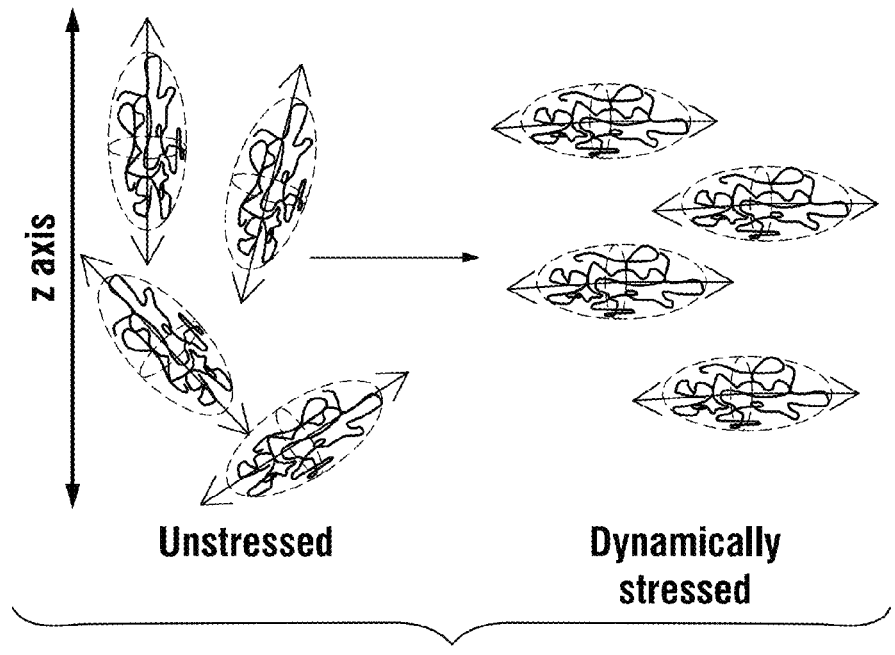
FIG. 5C shows reorientation of prolate LC polymer chains under compressive strain.

The dynamic mechanical analysis measurements together with WAXD patterns for stressed and unstressed LCEs establish a clear connection between stiffening and reorientation of the nematic LC director. In LCEs, network chain conformation is coupled to the nematic director orientation. Therefore, the observed reorientation of the mesogenic side-groups perpendicular to the compressive axis reflects a reorientation of the LCE network chains (FIG. 5C). The strain lines corresponding to a linear, compressive deformation can be calculated by performing finite element modeling simulations using COMSOL Multiphysics 4.2 simulation package. Simulation results predict elongational strains in the plane perpendicular to the compressive axis. This elongational strain is expected to preferentially align the ellipsoidal LCE network chains in the x-y plane and, due to coupling between the LC side-group and polymer backbone, result in the observed reorientation of the nematic director. 2D WAXD images indicate reorientation of the LC side-groups in the x-y plane, consistent with a preferential orientation of the LC side-groups parallel to the polymer backbone. The 2D WAXD data also enable calculation of a macroscopic alignment parameter $S=(3/2 \cos^2 \theta - 1/2)$ averaged over the entire sample, where y is the angle between the local director orientation and the x-y plane. The increase in macroscopic alignment is directly correlated with mesogen content, as shown in FIG. 4D. Furthermore, the coupling between mesogen side-group orientation and polymer orientation results in macroscopic changes to sample dimensions. In fact, dimensional changes up to 8.3% along compression (measure along z axis) and 7.7% along x and y axes are recorded, consistent with the coupling of macroscopic shape and global director orientation. As the stiffening response arises due to a director reorientation, stiffening is fully reversible. This is demonstrated by the observed relaxation of a sample subjected to dynamic compression: after 3 months, the stiffness returns to its initial value and the director orientation is polydomain. Similar relaxation is observed for a dynamically stressed sample annealed above the $T_{NI}$ for 4 h.

Without being bound by theory, the stiffening response can be understood within the theoretical framework of nematic rubber elasticity. For instance, it has been shown that for nematic LCEs, the free energy density satisfies the following equation:

$$F_{el} = \frac{1}{2}\mu Tr\left(\underline{\underline{l}}\underline{\underline{\lambda}}^T \underline{\underline{l}}^{-1}\underline{\underline{\lambda}}\right)$$

In the above equation, $\mu$ is the rubber elastic modulus, $\lambda$ is strain and 1 is the network step length tensor that describes the local (generally anisotropic) chain conformation. This theory assumes Gaussian, phantom network chains and the absence of quenched disorder. A consequence of this free energy expression is that strains $\lambda$ of the form:

$$\underline{\underline{\lambda}} = \underline{\underline{l}}^{1/2} W_\alpha \underline{\underline{l}}^{-1/2}$$

Figure 5D:
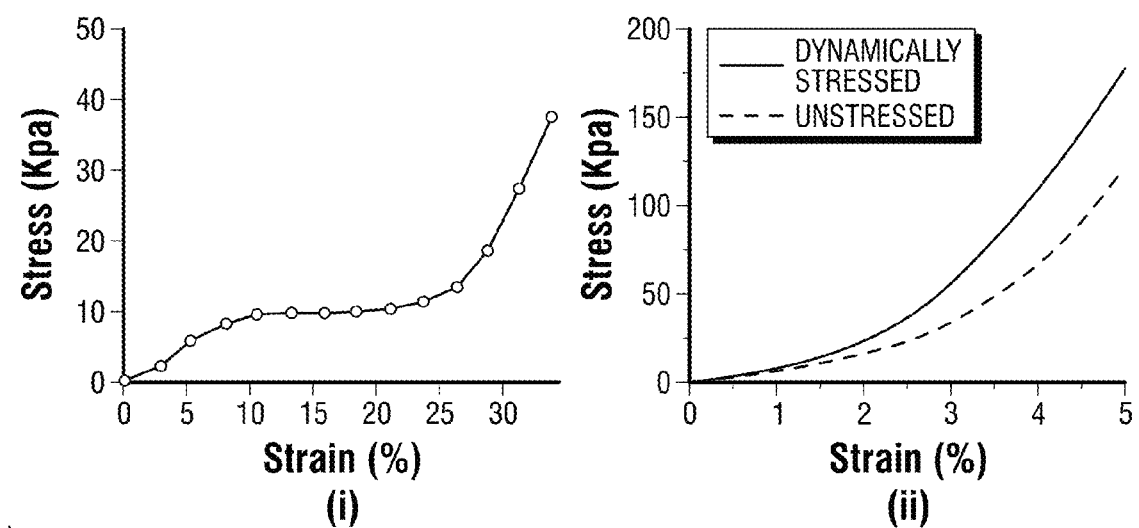
FIG. 5D shows stress-strain relationship of (i) polydomain LCE under uniaxial tension and (ii) polydomain LCE90 before and after dynamic compression. LCE90 stress-strain profiles are recorded along the compression axis.

In this equation, $W_\alpha$ is an arbitrary rotation by an angle $\alpha$, come with no increase to the elastic free energy. Thus, for this type of strain, the LCE deforms 'softly' with no resistance. This result only applies to the ideal case, but real elastomers more commonly exhibit semi-soft elasticity, with some resistance to deformation below a threshold stress value. An example of this for a polydomain LCE under uniaxial strain is shown in FIG. 5D, where the elastomer exhibits, after a strain threshold, a pronounced plateau in the stress. This stress plateau is a direct result of 'soft elasticity' and is associated with nematic director rotations. At higher strains, the nematic director is fully aligned, and director reorientations can no longer accommodate further strain, resulting in a stress increase. This particular example reflects the behavior of LCEs under large (410%) uniaxial strains. However, similar behavior is observed in the present study for LCEs under compression.

In initially unstressed samples, a 'soft' elastic response is observed. The softness or reduced stiffness is a result of a globally disordered nematic director that can accommodate deformations through rotation. However, extended dynamic compression results in a reorientation of the nematic director and a corresponding increase in stiffness (FIG. 5D). Similar to the behavior of LCEs under uniaxial tension, reorientation of the nematic director is associated with an increased resistance to deformation.

A comparison of deformed and undeformed LCEs shows that the measured stiffness increase is a distinctly nonlinear phenomenon. As shown in FIG. 5D, there is no difference in stiffness between stressed and unstressed samples for strain values of less than 1%. Thus, as expected, at low compressive strains, LCEs behave linearly, and the slope of the stress-strain curve simply reflects the equilibrium Young's modulus. Differences between stressed and unstressed LCEs are only observed for strain values greater than ~2%. This threshold value may reflect "semi-softness" in LCEs, which arises due to polymer chain length polydispersities, compositional fluctuations and other network non-idealities.

Strain stiffening in LCEs contrasts with the irreversible softening of polymeric networks under cyclic strain, a phenomenon known as the Mullins effect. Although the Mullins effect is not fully understood, it has been seen in crystallizable rubbers or rubbers with added fillers and has also been observed in biological tissue. Recently, stiffening behavior was reported for bundled actin networks under cyclic shear. This was observed at higher crosslink densities and attributed to the physical nature of the network, which allowed reorganization of the network constituents, resulting in hardening after cyclic shear. This contrasts with the dynamic stiffening reported here in covalent LCE networks. A novelty of the present Example is the discovery of dynamic stiffening in a synthetic, homogeneous polymeric network with liquid crystalline order. Additionally, the presence of liquid crystal order enables quantitative characterization of side-group and network chain orientation before and after deformation, thereby establishing a direct connection between stiffening and network chain conformation.

In summary, Applicants report LCE self-stiffening in response to dynamic, compressive loading. The stiffening behavior observed here is for a permanent network at low strains and can be attributed to a mobile nematic director. Director reorientation and alignment at low strains and dynamic compression has not been previously reported in LCEs and suggest underlying network relaxation modes at 5 Hz, which govern the response.

Materials

Toluene, Pt-catalyst ((dichloro(1,5-cyclooctadiene)platinum (II)), allylbromide, butanol, 11-bromo-1-undecene, sodium hydride (60% dispersion in mineral oil), hydroquinone, magnesium sulphate, PHMS (poly(hydromethylsiloxane)) ($M_w$=1,700-3,200 g per mole), ethyl acetate, 4-hydroxyl-4'-cyano biphenyl, sodium hydroxide, tetrahydrofuran, diethyl ether, dimethyl formamide (DMF), 6-bromo-1-hexanol, benzene, methanol and potassium carbonate were purchased from commercial suppliers and used as received. The cross-linker (1,4-di(10-undecenyloxy)benzene) was synthesized as described previously (Corros. Sci. 50, 3070-3077 (2008)).

Preparation of 4-(1-hexanol oxy)-4'-cyano biphenyl (3)

4-Hydroxyl-4'-cyano biphenyl (1, 7 mmol, 1.36 g), 6-bromo-1-hexanol (2, 10 mmol, 1.83 g), and $K_2CO_3$ (14 mmol, 1.934 g) were dissolved in 25 ml DMF and heated to 90 C for 20 h. The reaction was then quenched by adding water and filtering to collect a white precipitate. The precipitate was then dried under vacuum and recrystallized in benzene to obtain the desired product. $^1$H NMR (400 MHz, $CDCl_3$), $\delta$ (p.p.m.): 7.8-7.6 (m, 4H) 7.54-7.50 (d, 2H), 7.0-6.9 (d, 2H), 4.20 (t, 2H), 3.36 (t, 2H), 1.8 (m, 2H), 1.7 (m, 2H), 1.40 (m, 4H).

Preparation of Mesogenic Side-Group (4)

3 (6 mmol, 1.77 g) was slowly added to a solution of sodium hydride (12.5 mmol, 0.3 g) in 30 ml diethyl ether/DMF (10:1). The reaction mixture was stirred under nitrogen atmosphere for 1 h before cooling to 0° C. and adding a solution of allylbromide (1.2 g, 10 mmol) in 5 ml diethyl ether dropwise. The reaction was allowed to proceed overnight before adding brine to quench the reaction. The layers were separated and the organic layer was washed with 1N HCl and water. The product was concentrated under reduced pressure and purified by column chromatography (silica gel, eluent: ethyl acetate/hexanes 1:9 v/v). $^1$H NMR (400 MHz, CDCl$_3$), δ (p.p.m.): 7.7-7.5 (m, 6H), 7.0-7.1 (d, 2H), 5.8 (m, 1H), 5.0 (d, 2H), 4.2 (t, 2H), 4.0 (d, 2H), 3.4 (t, 2H), 1.8-1.4 (m, 8H).

Preparation of Polydomain LCE

Polydomain LCEs were prepared by coupling liquid crystal mesogens to poly(hydrogenmethylsiloxane) (PHMS) (FIG. 2A), as has been previously reported (Makromol. Chem. Rapid Commun. 12, 717-726 (1991)). The resulting materials are rubbery (Tg~−30° C.), nematic networks with no global orientation of the nematic director (polydomain). Briefly, mesogenic side-group (4), 4-(1-hexanol oxy)-4'-cyano biphenyl crosslinker, and PHMS (poly(hydromethylsiloxane)) were dissolved in toluene along with the Pt-catalyst, and the reaction was allowed to proceed at 70° C. for 3 days. Elastomers were then swollen in dichloromethane for several days to wash out the unreacted materials and nonreactive solvent. By gradually increasing the methanol content of swelling solvent, elastomers were de swollen and then air-dried before testing.

Dynamic Mechanical Analysis

For the DMA studies, the samples were razor cut to dimensions of 1.5×1.5×1 mm$^3$. All sample dimensions were measured using DMA and verified with a digital caliper. DMA was carried out in compression mode as illustrated in FIG. 2B using TA Instruments Q800 DMA at a 5% strain amplitude, 5 Hz frequency and at a preload of 0.01 N. All the tests were conducted isothermally at 45° C., except where otherwise noted.

The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A liquid crystal elastomer with enhanced stiffness,
   wherein the liquid crystal elastomer comprises a mobile nematic director capable of rotating or re-orienting in response to dynamic stress, and a mesogen associated with a polymer,
   wherein the stiffness of the liquid crystal elastomer is enhanced by placing the liquid crystal elastomer in an environment that applies dynamic stress to the liquid crystal elastomer,
       wherein the liquid crystal elastomer is in a nematic phase before or during the application of dynamic stress, and
       wherein the application of dynamic stress enhances the stiffness of the liquid crystal elastomer by more than about 10%.

2. The liquid crystal elastomer of claim 1, wherein the dynamic stress is applied by dynamic compression.

3. The liquid crystal elastomer of claim 1, wherein the dynamic stress is applied below the nematic to isotropic transition temperature ($T_{NI}$) of the liquid crystal elastomer.

4. The liquid crystal elastomer of claim 1, wherein the liquid crystal elastomer is a polydomain liquid crystal elastomer.

5. The liquid crystal elastomer of claim 1, wherein the liquid crystal elastomer has a mesogen content ranging from about 20% molar content to about 90% molar content of the liquid crystal elastomer.

6. The liquid crystal elastomer of claim 1, wherein the mesogen is selected from the group consisting of aromatic rings, aliphatic rings, poly aromatic rings, poly aliphatic rings, phenyls, biphenyls, benzenes, and combinations thereof.

7. The liquid crystal elastomer of claim 1, wherein the mesogen is functionalized with one or more functional groups, wherein the functional groups are selected from the group consisting of alkenes, alkanes, alkynes, carboxyl groups, esters, halogens, and combinations thereof.

8. The liquid crystal elastomer of claim 1, wherein the polymer is selected from the group consisting of polysiloxanes, poly(methyl)siloxanes (PMS), poly(dimethyl)siloxanes (PDMS), poly(hydrogen methyl)siloxanes (PHMS), and combinations thereof.

9. The liquid crystal elastomer of claim 1, wherein the mesogen is cross-linked to the polymer.

10. The liquid crystal elastomer of claim 1, wherein the application of dynamic stress enhances the stiffness of the liquid crystal elastomer by between about 10% to about 90%.

* * * * *